US005442712A

United States Patent [19]

Kawamura et al.

[11] Patent Number: 5,442,712

[45] Date of Patent: Aug. 15, 1995

[54] SOUND AMPLIFYING APPARATUS WITH AUTOMATIC HOWL-SUPPRESSING FUNCTION

[75] Inventors: Akihisa Kawamura, Hirakata; Masaharu Matsumoto, Katano; Mitsuhiko Serikawa, Nishinomiya; Hiroko Numazu, Kadoma, all of Japan

[73] Assignee: Matsushita Electric Industrial Co., Ltd., Osaka, Japan

[21] Appl. No.: 113,658

[22] Filed: Aug. 31, 1993

[30] Foreign Application Priority Data

Nov. 25, 1992 [JP] Japan .................... 4-314819
Mar. 9, 1993 [JP] Japan .................... 5-047700

[51] Int. Cl.$^6$ .................... H04R 27/00; H04B 15/00
[52] U.S. Cl. .................... 381/83; 381/93
[58] Field of Search .................... 381/83, 93

[56] References Cited

U.S. PATENT DOCUMENTS 4,888,808 12/1989 Ishikawa et al. .................... 381/103
5,245,665 9/1993 Lewis et al. .................... 381/83

FOREIGN PATENT DOCUMENTS 288159 10/1988 European Pat. Off. .
340516 11/1989 European Pat. Off. .
59-161995 9/1984 Japan .................... 381/93
63-005697 1/1988 Japan .
63-17896 1/1988 Japan .................... 381/93
63-018796 1/1988 Japan .
WO91/20134 12/1994 WIPO .

*Primary Examiner*—Forester W. Isen
*Attorney, Agent, or Firm*—Wenderoth, Lind & Ponack

[57] ABSTRACT

A sound signal picked-up by a microphone is processed in a howl suppresser including a digital filter. A frequency analyzer performs frequency analysis of the picked-up sound signal. A howl detector detects a howl contained in the sound signal from a result of frequency analysis by the frequency analyzer. A coefficient calculator calculates coefficients to be input to the digital filter to suppress the howl according to a detection result by the howl detector, and a controller inputs the calculated coefficients to the digital filter. The howl detector judges that a maximum peak power level among power levels of the sound signal in a frequency region analyzed by the frequency analyzer is a howl component when a ratio of the maximum peak power level to a mean power level of the sound signal is larger than a predetermined threshold level, preferably for a predetermined threshold time. Also, a threshold controller is provided for controlling the threshold level and/or the threshold time so as to enhance the accuracy of the howl detection.

19 Claims, 13 Drawing Sheets

SOUND AMPLIFYING APPARATUS WITH AUTOMATIC HOWL-SUPPRESSING FUNCTION

BACKGROUND OF THE INVENTION

1. Field of the Invention

The present invention relates to a sound amplifying apparatus for amplifying sounds or voices picked-up by a microphone and delivering amplified sounds or voices through a speaker, and more particularly to a sound amplifying apparatus having howl-suppressing capability.

2. Description of the Prior Art

At a lecture or the like using electro-acoustic; appliances such as microphones and speakers, howling often occurs when the lecturer moves or if the condition in the hall changes. The "howl" is an undesirable prolonged sound produced because of acoustic feedback. In case howling occurs, the acoustic adjuster ("mixer", hereafter) either lowers the sound signal level in the frequency hand in which the howl would be occurring by means of a graphic equalizer, or lowers the entire output level. When the howl is suppressed or the position of the lecturer is changed, i.e., when the condition of sound pickup varies, the mixer returns the characteristic of the graphic equalizer or the entire level to the original characteristic or level. Every time a howl occurs, the mixer repeats this action to suppress the howl.

In such constitution, however, when a howl occurs, the mixer must always lower the frequency of the graphic equalizer, so that it takes labor to suppress the howl. Also, since the frequency band for lowering the graphic equalizer cannot be instantly and accurately known, and it takes time to suppress the howl.

SUMMARY OF THE INVENTION

It is hence a primary object of the invention to present a sound amplifying apparatus capable of suppressing a howl automatically and accurately, even during the conditions of a relatively large background noise level such as air-conditioning noise and the murmur of voices.

To achieve this object, the present invention provides a sound amplifying apparatus comprising: a microphone for picking up a sound to obtain a sound signal; an analog-to-digital converter for converting the sound signal from the microphone to a digital sound signal; a howl suppressor including a digital filter for processing the digital sound signal; a digital to analog converter for converting a processed digital sound signal from the howl suppressor into a processed analog sound signal; an amplifier for amplifying the processed analog sound signal to obtain an amplified sound signal; a speaker responsive to the amplified sound signal for generating an amplified sound; a frequency analyzer for frequency analyzing the digital sound signal from the analog-to-digital converter in real time; a howl detector for detecting a howl contained in the sound signal from a result of frequency analysis by the frequency analyzer; a coefficient calculator for calculating coefficients to be input to the digital filter to suppress the howl according to a detection result by the howl detector and controller for inputting the calculated coefficients from the coefficient calculator to the digital filter.

The howl detector may judge that a maximum peak power level among power levels of the sound signal in a frequency region analyzed by the frequency analyzer is a howl component when a ratio of the maximum peak power level to a mean power level of the sound signal is larger than a predetermined threshold level. Preferably, the howl detector means may judge the maximum peak power level as a howl component when the ratio of the maximum peak power level to the mean power level is larger than the predetermined threshold level for a predetermined threshold time. Preferably, the howl detector may calculate the mean power level by omitting first to m-th largest peak power levels from all power levels in the frequency region, where m is a predetermined integer, and calculating a mean value of the remaining power levels.

In another aspect of the Invention, the sound amplifying apparatus may include a threshold controller for controlling the threshold level and/or the threshold time. The threshold controller may be responsive to the result of frequency analysis by the frequency analyzer means for changing the threshold level depending on a frequency band in which the frequency of the maximum peak power level is located or depending on a frequency characteristic of a background noise contained in the sound signal or depending on a frequency characteristic of the sound signal. The apparatus may further comprise a voice detector responsive to the result of frequency analysis by the frequency analyzer for judging whether or not the picked-up sound is a voice, and the threshold controller may be responsive to a judging result by the voice detector for changing the threshold level when the picked-up sound is a voice. The apparatus may further comprise a frequency characteristic measuring device for measuring a frequency characteristic of a room in which the microphone and speaker are located from a position of the speaker to a position of the microphone, and the threshold controller may be responsive to a measuring result by the frequency characteristic measuring device for changing the threshold level depending on the frequency characteristic of the room.

The threshold controller may be responsive to the result of frequency analysis by the frequency analyzer for changing the threshold time depending on a frequency band in which the frequency of the maximum peak power level is located. The apparatus may further comprise a echo measuring device for measuring an echo time in a room in which the microphone and speaker are located, and the threshold controller may be responsive to a measuring result by the echo time measuring device for changing the threshold time depending on the echo time.

The above and other features and advantages of the invention will be more apparent from the following description with reference to the accompanying drawings.

DESCRIPTION OF THE PREFERRED EMBODIMENTS

Figure 1:
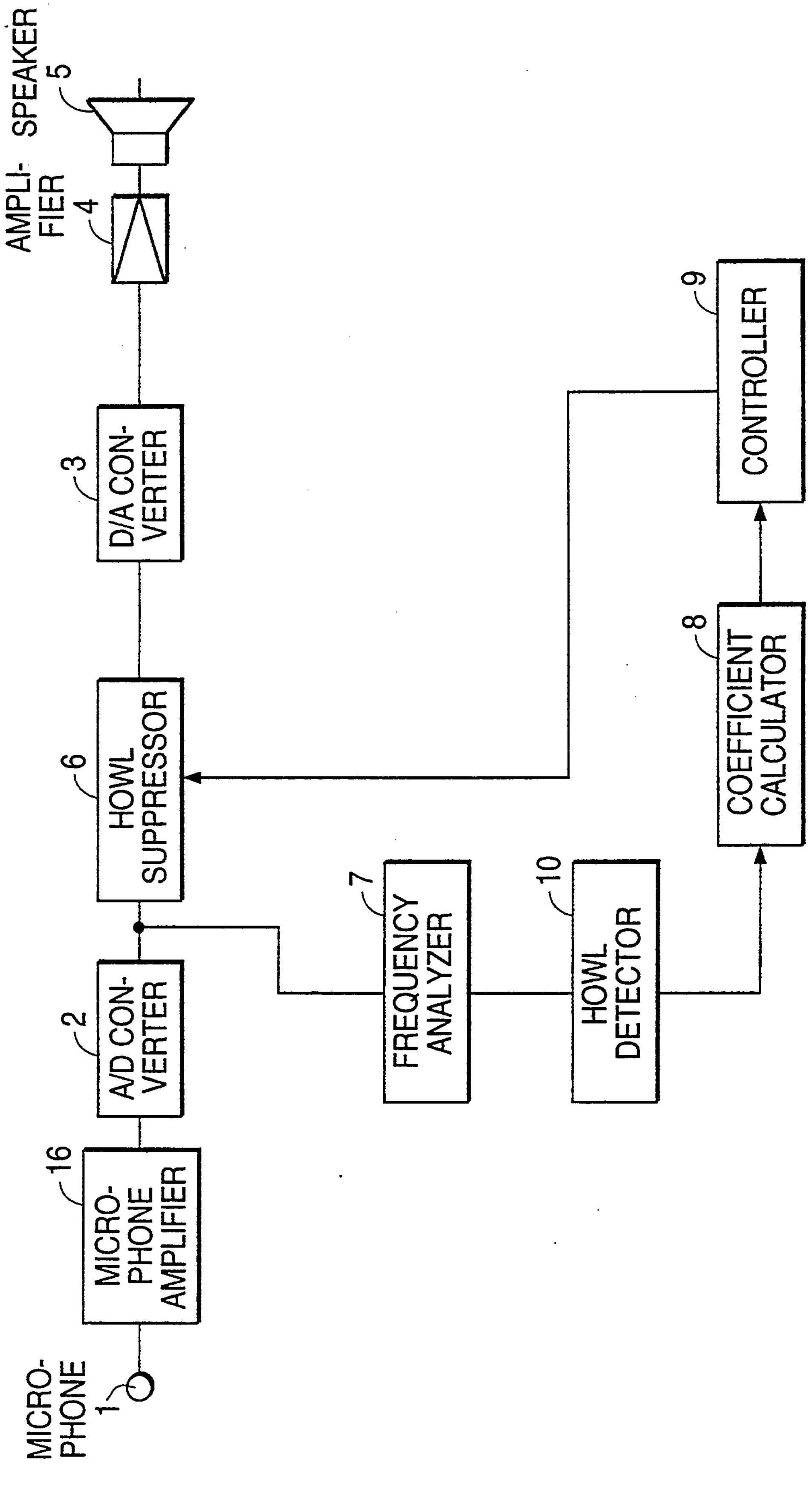
FIG. 1 is a block diagram of a sound amplifying apparatus in accordance with an embodiment of the present invention.

FIG. 1 is a block diagram of a sound amplifying apparatus in accordance with an embodiment of the invention.

In FIG. 1, element 1 is a microphone for picking up sound; element 16 is a microphone amplifier; element 2 is an A/D (analog/digital) converter for converting the picked-up sound into a digital sound signal; element 3 is a D/A (digital/analog) converter for converting a digital sound signal into an analog sound signal; element 4 is an amplifier for amplifying the output signal of the D/A converter; element 5 is a speaker for reproducing sound from the signal amplified by the amplifier 4; element 6 is a howl suppressor for lowering the signal level at the howling frequency by applying a notch filter processing to the digital Sound signal from the A/D converter 2; element 7 is a frequency analyzer for transforming the signal from the A/D converter 2 into a frequency region by a fast Fourier transform (FFT) or by using plural band-pass filters; element 10 is a howl detector for detecting howl on the basis of the frequency analysis result of the frequency analyzer 7; element 8 is a coefficient calculator for calculating coefficients of a digital filter included in the howl suppressor, and element 9 is a controller for inputting the coefficients of the digital filter obtained in the coefficient calculator 8 to the digital filter in the howl suppressor.

Sound, such as a performance by a performer, is picked up by the microphone 1, processed through the A/D converter 2, howl suppressor 6 and D/A converter 3, amplified in the amplifier 4, and is reproduced through the speaker 5. Usually, in this state, in order that a howl may not occur, the gain of the amplifier and microphone amplifier are adjusted appropriately. However, when the performer moves or the direction of the microphone 1 is changed, the loop gain in the sound pickup and reproducing system increases. When the loop gain exceeds 1, a howl is produced.

The sound signal from the microphone 1 is converted into a digital sound signal in the A/D converter 2. The digital sound signal is fed into the howl suppressor 6 and the frequency analyzer 7.

The digital sound signal from the A/D converter 2 is converted into components in the frequency region, or power spectrums, in the frequency analyzer 7 by FFT processing.

Figure 2:
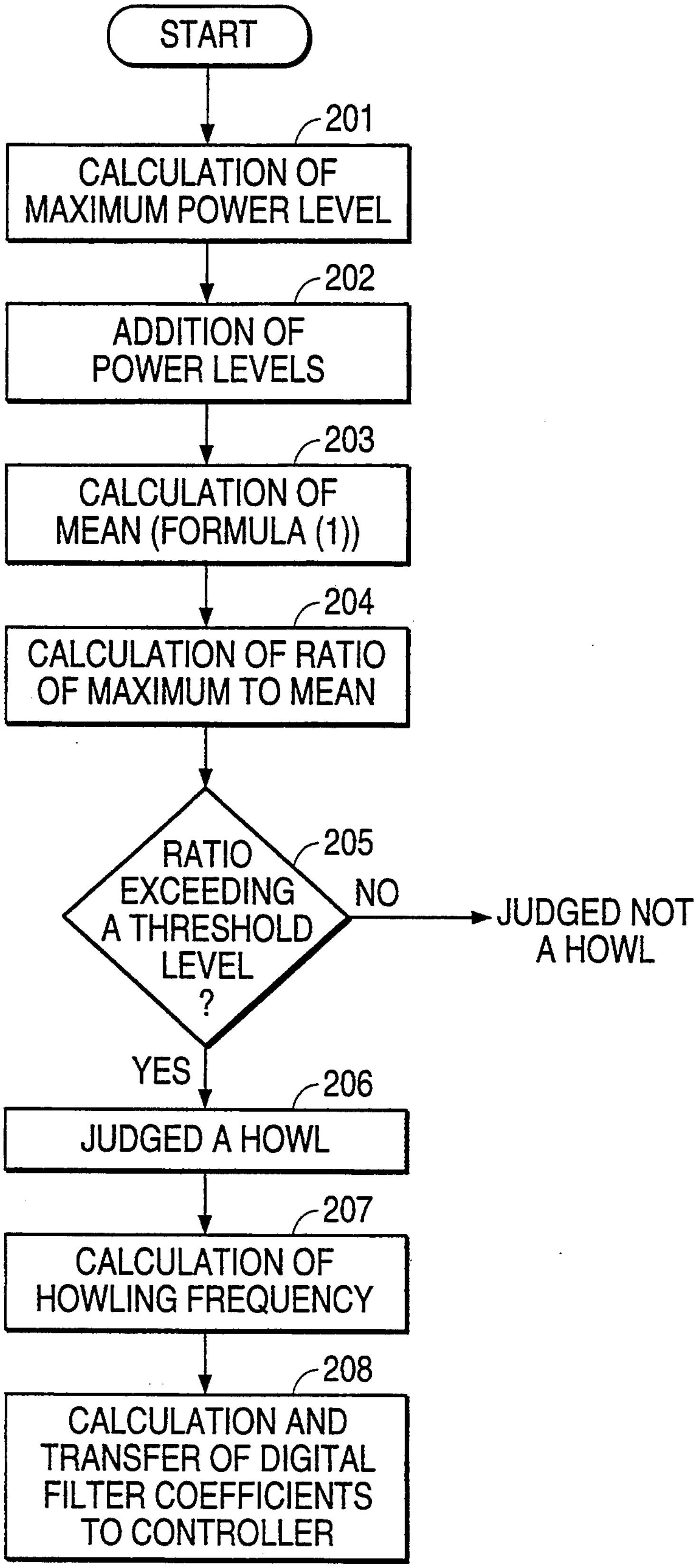
FIG. 2 is a flowchart showing a method for detecting a howl by the howl detector in the embodiment of FIG. 1.

Next is shown a method of detecting a howl in the howl detector 10. FIG. 2 is a flowchart of processing in the howling detector 10. First, the maximum level of the power levels in the frequency region is searched (step 201). Then the mean value of the power levels in the frequency region is calculated by the method expressed by the formula (1) shown below. To determine the mean value, the largest three power levels in the frequency region are removed (the number of the largest power levels to be removed may be changed according to the interval of frequency to be analyzed such that the number is smaller when the frequency interval is wider and larger when the frequency interval is narrower), and all of the remaining power levels are added (step 202). The added result is divided by the number of added power levels to obtain the mean value (step 203).

Formula (1):

$$P_{AV} = \left( \sum_{J=1}^{N} X(j) - (X(P1) + X(P2) + X(P3)) \right) / (N - 3)$$

where

P1: frequency of the largest power level

P2: frequency of the second largest power level

P3: frequency of the third largest power level

N: number of frequency points $P_{AV}$: mean power level

X(j): power level of j-th frequency

Then, based on formula (2) shown below, the ratio of the maximum peak power level to the mean power level is determined (step 204). When the ratio exceeds a predetermined value which is set so as a to be regarded as howl (hereinafter called a "threshold level"), it is judged that a howl is produced at the frequency of the peak power level (steps 205, 206).

Formula (2):

$$P_{SUB} = P_{MAX}/P_{AV}$$

$$P_{MAX} = x(p1)$$

where $P_{SUB}$: ratio of maximum peak power level to mean power level $P_{MAX}$: peak power level A howl occurs at a single frequency, but the power levels in the frequency band around the howling frequency are also larger than the power levels at other frequencies. Hence, the mean power level increases with an increase of a howl. That is, the howl significantly influences the mean power level. Accordingly, by omitting the first through m-th largest power levels in the calculation of the mean power level in formula (1), the ratio of power levels between the howl and non-howling components is increased so that the howl is emphasized.

Figure 3A:
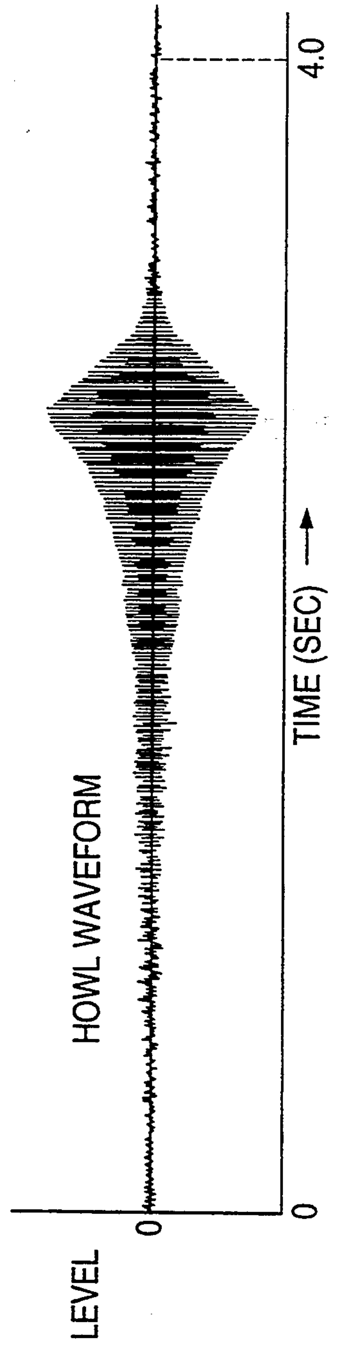
FIGS. 3(*a*)–3(*b*) are comparative diagram of a method of an embodiment of the invention and a conventional method, in which FIG. 3(*a*) shows a howl waveform, and FIG. 3(*b*) shows a comparison of a ratio of a maximum peak level and a mean power level.
Figure 3B:
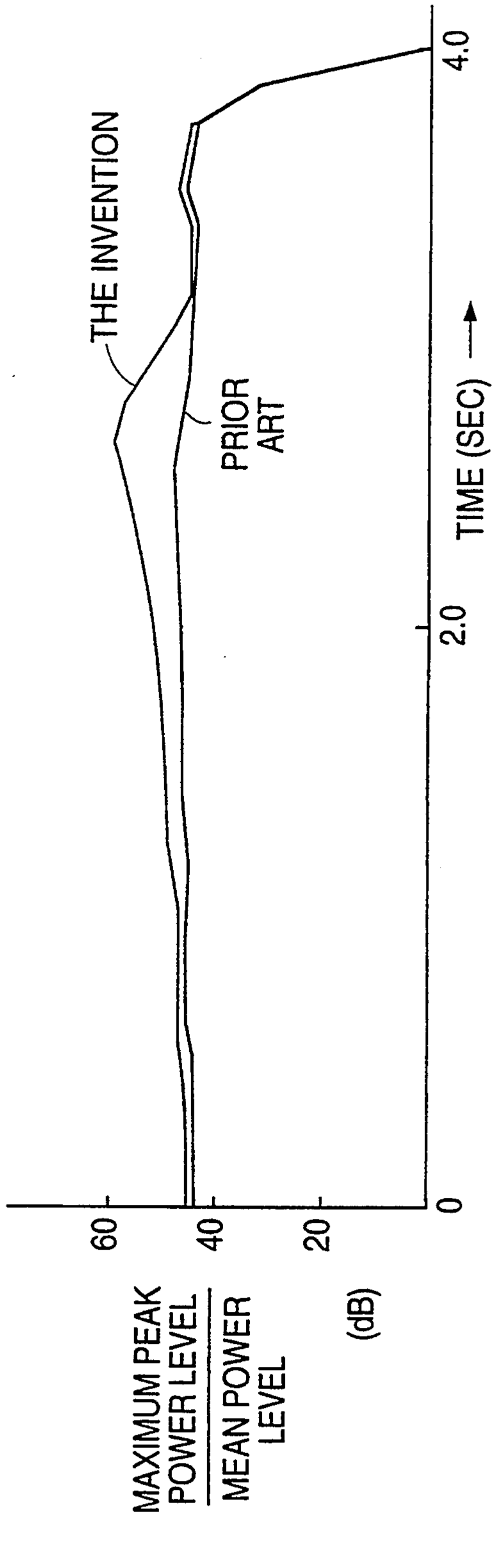

FIGS. 3(*a*)–(*b*) show a result of comparing the ratio of the peak power level to the mean power level determined by dividing all power levels by the number of all power levels at all frequencies as a conventional method, in howling state, and the ratio of the peak power level to the mean power level determined in accordance with the method of the present invention. FIG. 3(*a*) shows a howl waveform, and FIG. 3(*b*) shows the peak to mean power level ratios. As seen from FIGS. 3(*a*)–3(*b*), according to the present invention, the ratio curve has a significant peak when a howl occurs, so that the howl can be accurately detected.

Figure 4A:
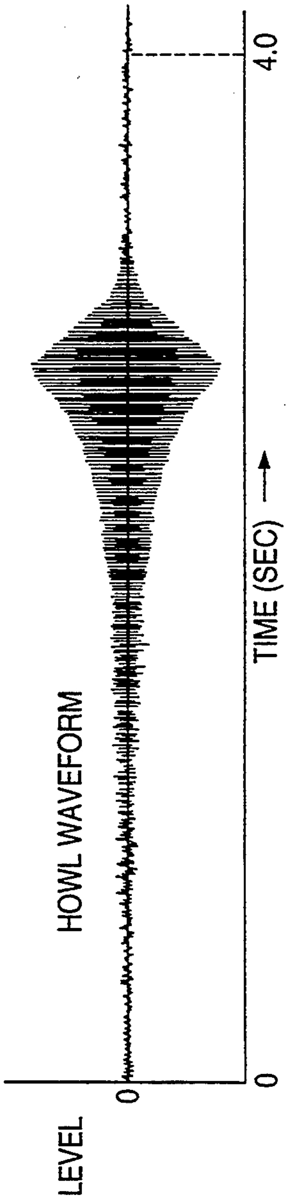
FIGS. 4(*a*)–4(*c*) show a result of the detection of a howl in an accordance with embodiment of the present invention, in which FIG. 4(*a*) shows a howl waveform, FIG. 4(*b*) shows a ratio of a peak level and a mean power level, and FIG. 4(*c*) shows a peak frequency.
Figure 4B:
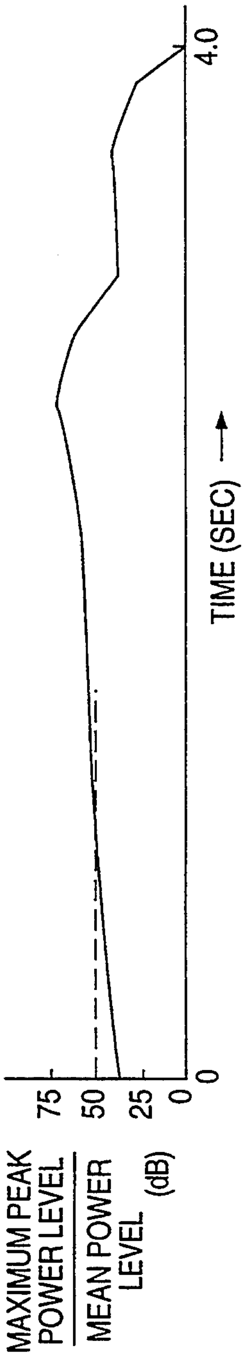
Figure 4C:
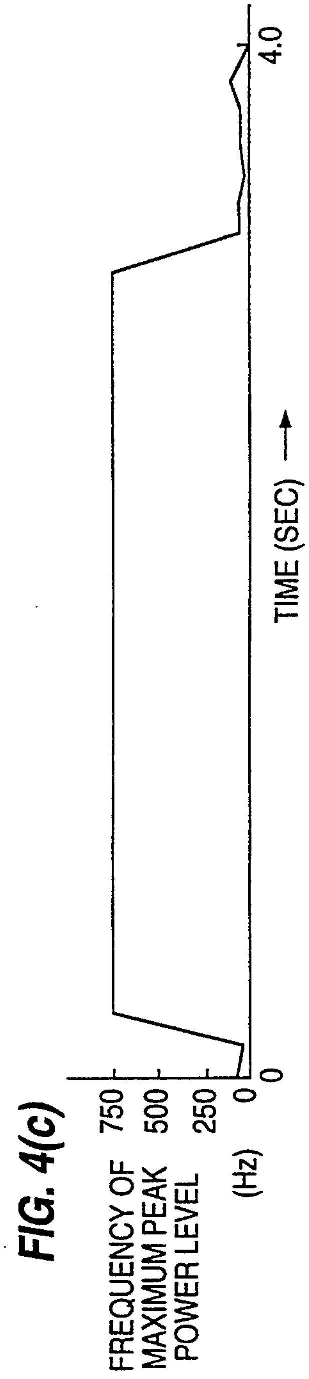

FIGS. 4(*a*)–4(*c*) show the howl waveform and the result of analysis of the waveform by the method of the embodiment. FIG. 4(*a*) shows the howl waveform, FIG. 4(*b*) shows changes of the ratio of the peak power level to the mean power level by the method of the embodiment, and FIG. 4(*c*) shows the frequency of the peak power level. Thus, as the howl signal increases, it is known that the ratio of the peak power level to the mean power level increases. For the value of the ratio, accordingly, a proper threshold level is set as shown in FIG. 4(*b*). In the howl detector 7, when the ratio exceeds the threshold level, it is regarded that a howl has occurred, and the howling frequency is calculated at the same time (step 207).

Since footsteps and other ordinary background noise are wide in the frequency band and the ratio of the peak to mean power levels is smaller than in the case of a howl, they are not regarded as a howl.

When the howl is detected and the howling frequency is calculated, the coefficient calculator 8 calculates the coefficients for composing a digital filter as so to lower the gain of only the howling frequency component in the howl suppressor 6 (step 208). The calculated coefficients of digital filter are input to the howl suppressor 6 by the controller 9.

In this embodiment, a notch filter is used as the digital filter in the howl suppressor 6. Alternatively, in the howl suppressor 6, a graphic equalizer capable of attenuating the howling frequency band component automatically depending on the howling frequency may be used.

By this operation, when a howl occurs, its frequency component is removed by the digital filter in the howl suppressor 6, so that the howl can be suppressed.

In this way, by analyzing the frequencies in the frequency analyzer 7 and the howl detector 10, judging the howl from the peak to mean power level ratio, determining the howling frequency, and removing the howling frequency component by the notch filter, the howl can be eliminated even when the background noise is large.

In the embodiment, the case of a howl caused due to the acoustic feedback from one speaker through one microphone is shown, but the same effects are obtained in the case of using plural microphones and speakers.

Hereinafter, a sound amplifying apparatus in accordance with another embodiment of the Invention is explained below while referring to the drawings.

The constitution is the same as the one shown in FIG. 1.

Figure 5A:
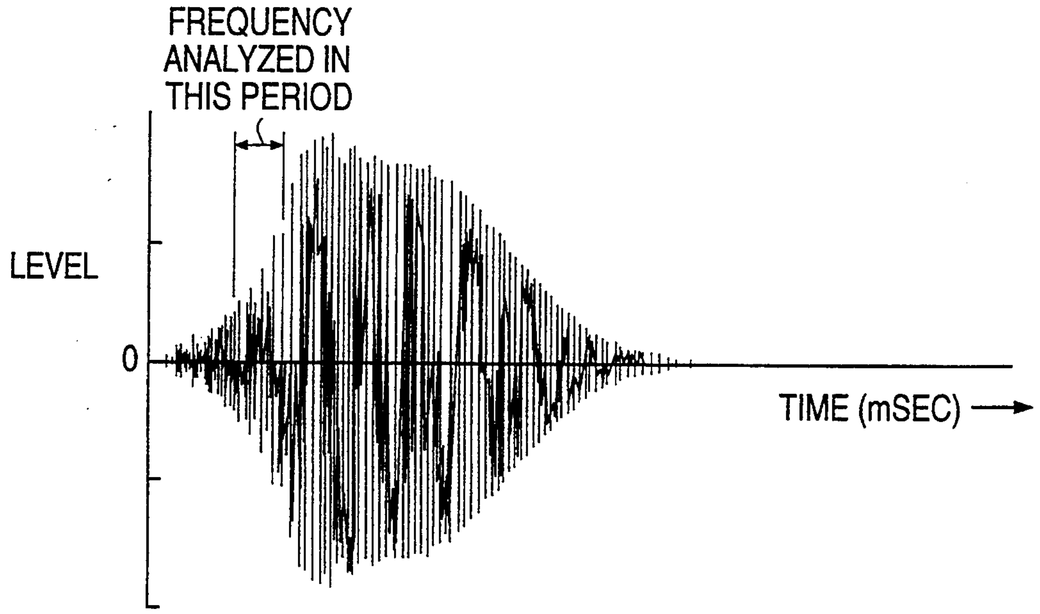
FIG. 5(*a*)–5(*b*) show an input signal waveform in accordance with an embodiment of the present invention and its FFT frequency characteristic diagram, in which FIG. 5(*a*) shows the input signal waveform, and FIG. 5(*b*) shows a frequency analyzed waveform.
Figure 5B:
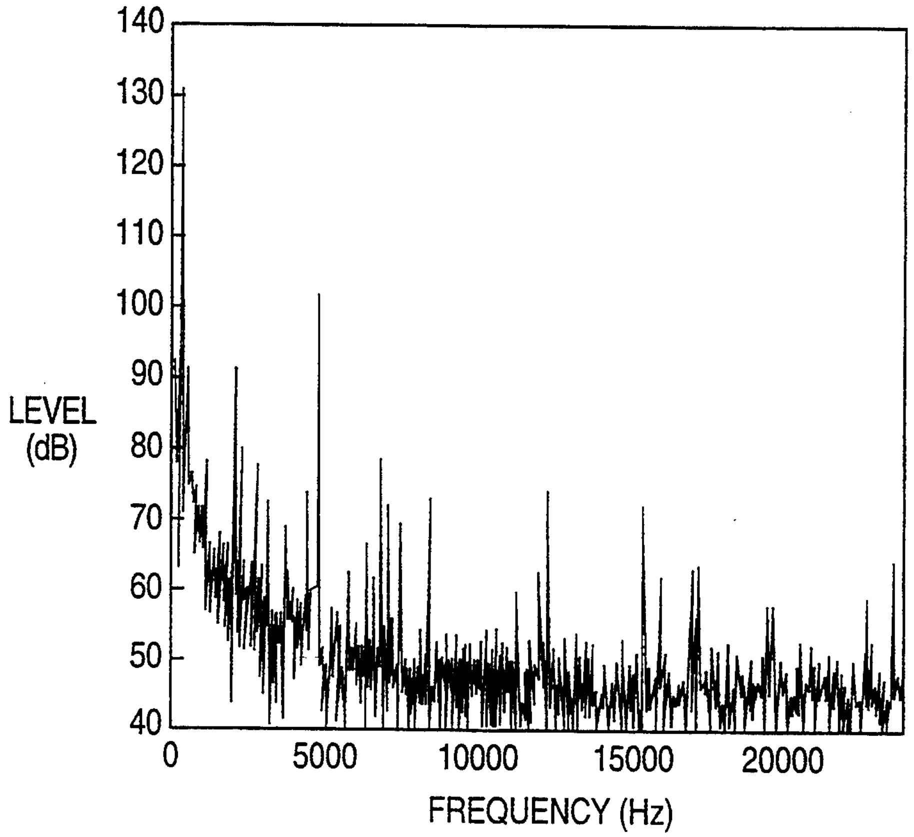

Up to the frequency analyzer 7, the operation is exactly the same as In the foregoing embodiment. FIGS. 5(*a*)–5(*b*) respectively show a howl waveform when plural howls occur simultaneously, and the frequency characteristic analyzed by the frequency analyzer 7.

Figure 6A:
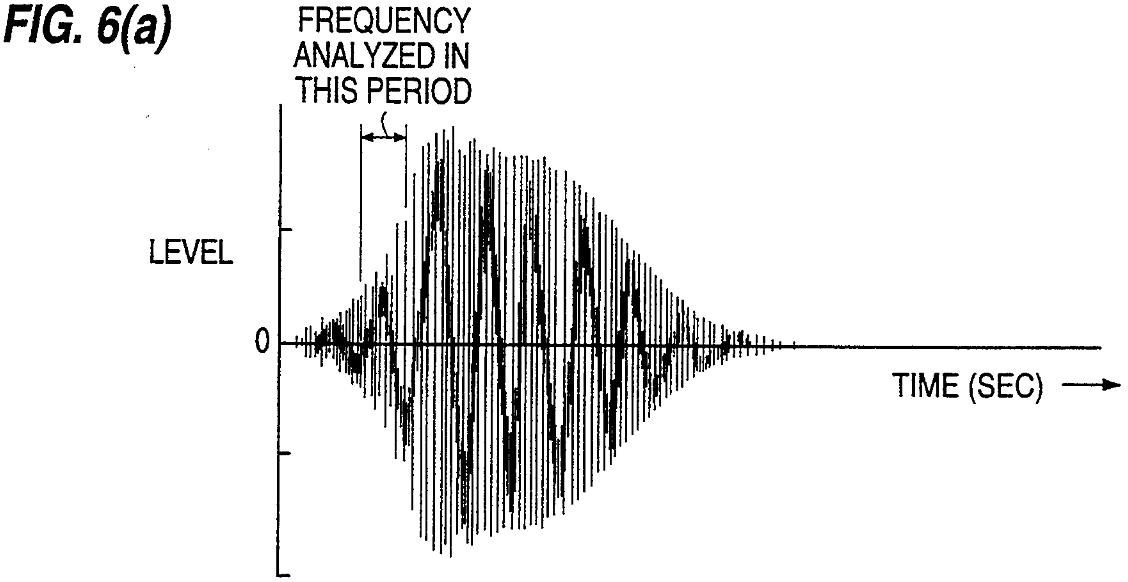
FIG. 6(*a*)–6(*c*) show a result of detecting a howl in accordance with another embodiment of the present invention, in which FIG. 6(*a*) shows a howl waveform, FIG. 6(*b*) shows changes of peak level with time, and FIG. 6(*c*) shows changes of a peak frequency with time.
Figure 6B:
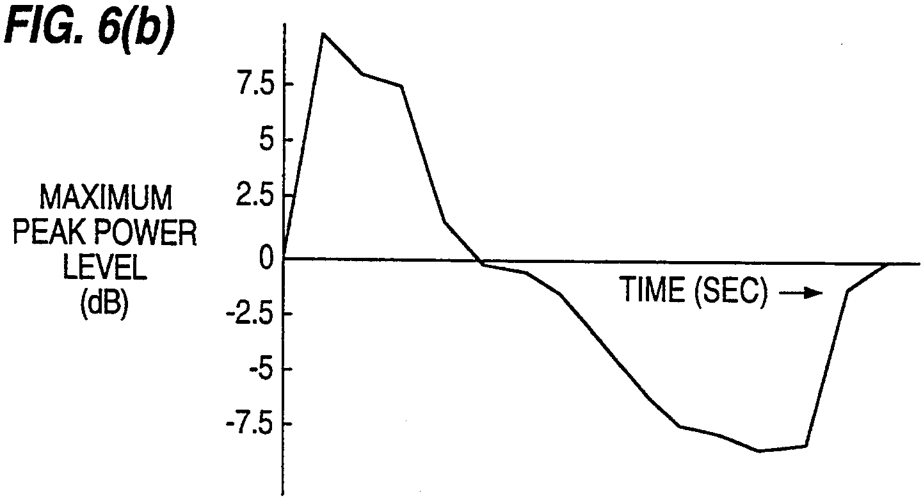
Figure 6C:
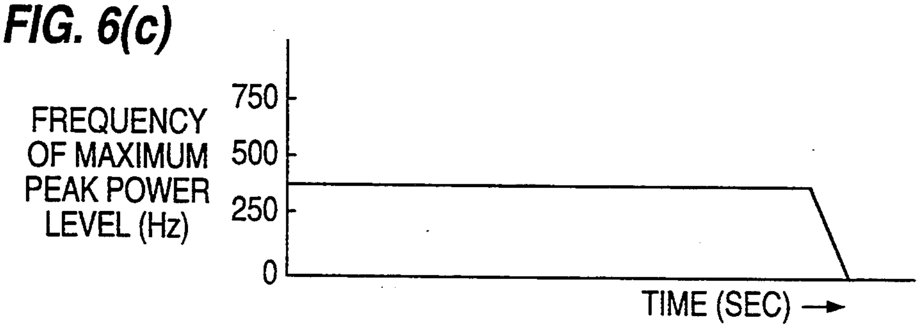

When the howling frequencies are great in number, the mean power level rises, so that the peak to mean power level ratio becomes small, and the howl detection precision is worsened. Accordingly, as the parameters for howl detection, the change of the peak power level and the continuity of the peak power frequency are used. FIGS. 6(*a*)–6(*c*) respectively show howl maximum peak power level change with time, and a change of maximum peak power frequency with time. In the condition that plural howls are produced as in FIG. 6(*a*)–(*d*), likewise, the maximum peak power frequency of the maximum peak power level is stable, and the maximum peak power level increases. In this embodiment, as the conditions of a howl, the continuity of the frequency of the maximum peak power level, power level increase or decrease of the maximum peak power level, and increase or decrease of the total power level determined by formula (*3*) are judged.

Formula (3):

$$P_A = aa^*P_A + (1-aa)\ ^*x(i)^2$$

where s $P_A$: total power level x(i): input signal aa: coefficient satisfying the condition of $0<aa<1$ In this embodiment, the value of aa is set around 0.99.

A howl is detecetd when the frequency of the maximum peak power level continues over a specific time, the maximum peak power level has increased from the result of previous analysis by the frequency analyzer 7, and the total power level has also increased from a defined value. The frequency analyzer 7 analyzes frequencies at specific time intervals. Accordingly, the continuity time of the frequency of the maximum peak power level is determined from the time required for one frequency analysis by the frequency analyzer 7 and the frequency characteristic of the background noise.

In this way, when a howl grows, the peak level also increases, and the frequency becomes constant. Therefore, by the above judgement, a howl can be detected. According to this method, general noise is hardly mistaken as a howl because peak frequency fluctuations are large and its peak level does not increase monotonically. For pulse-like noise, mistakes can be prevented by properly judging the duration time of the peak frequency.

The subsequent processing is the same as that in the preceding embodiment.

By thus judging the increase or decrease of the peak power level and the continuity of peak power frequency, in this sound amplifying apparatus, a howl can be detected at a relatively high precision even in the conditions of noise or plural howls.

In the background noise, incidentally, if the level of the low frequency is large, detection errors can be further decreased by detecting and processing the signals absent the background noise in the low frequency band by using a high pass filter in a later stage of the microphone amplifier 16.

A sound amplifying apparatus in accordance with a different embodiment of the present invention is described below by reference to the accompanying drawings.

It is an object of this embodiment to suppress a howl by accurately detecting a howl even when the background noise is large or the echo time is long.

Figure 7:
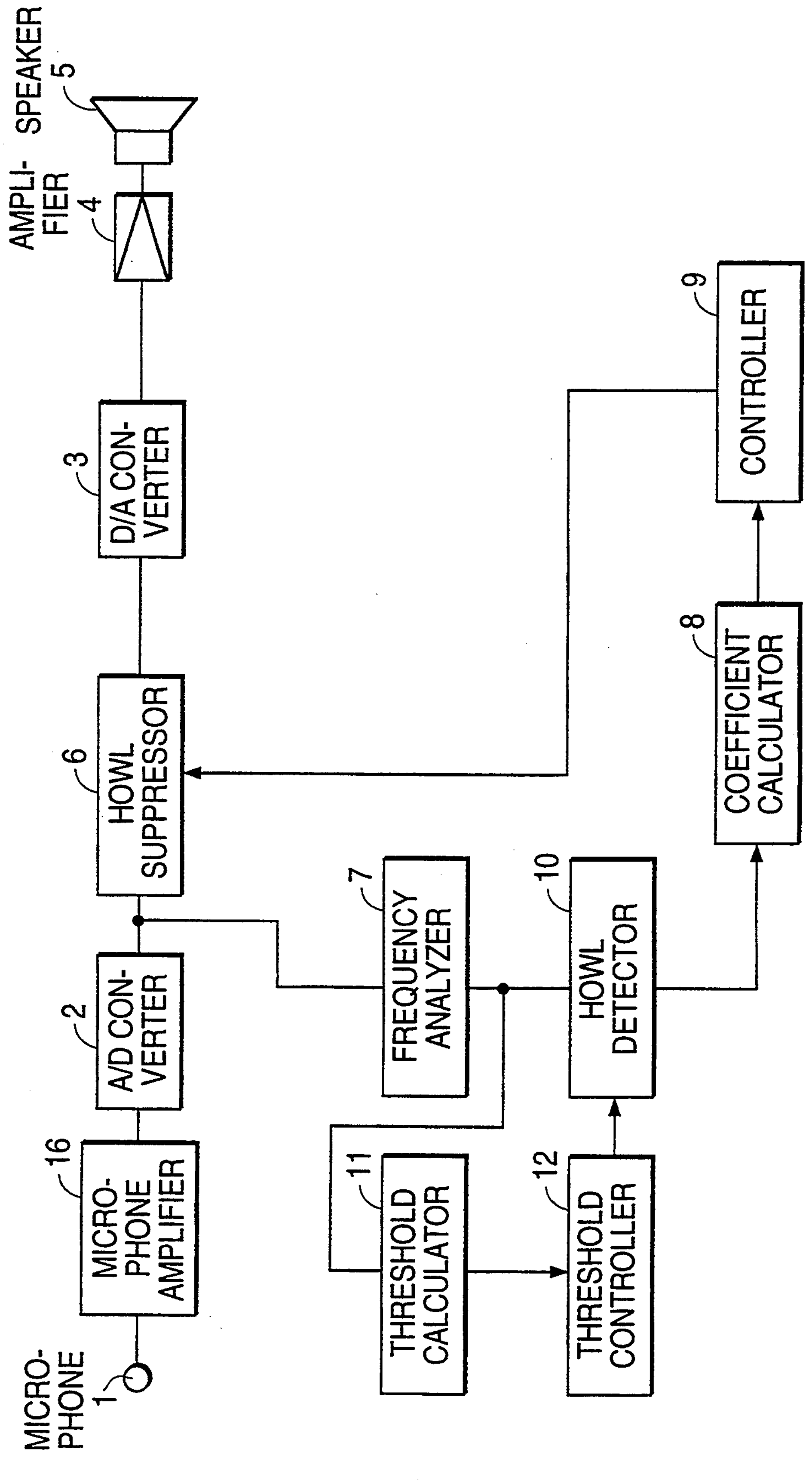
FIG. 7 is a block diagram of a sound amplifying apparatus in accordance with another embodiment of the present invention.

FIG. 7 is a block diagram of the sound amplifying apparatus in accordance with this embodiment of the present invention.

In FIG. 7, element 11 is a threshold calculator for calculating the threshold level for detecting howl, and the threshold time to be detected as a howl when the frequency of the maximum peak power level continues more than a specific time, and element 12 is a threshold controller for inputting the threshold level to the howl detector 10.

The other constituent elements are the same as those in the embodiment of the invention shown in FIG. 1.

The sound signal picked up by the microphone 1 is converted into a digital sound signal by the A/D converter 2, and is fed to the howl suppressor 6 and the frequency analyzer 7. The frequency analyzer 7 always analyzes the frequencies of the signal output from the A/D converter 2 at specific time intervals. As the method of detection of howl of the howl detector 10, the ratio of the peak power level to the mean power level in the frequency region is determined, and when the ratio exceeds a specific threshold level and the duration exceeding the threshold level is over a specific threshold time, it is determined that a howl has been produced.

Figure 8A:
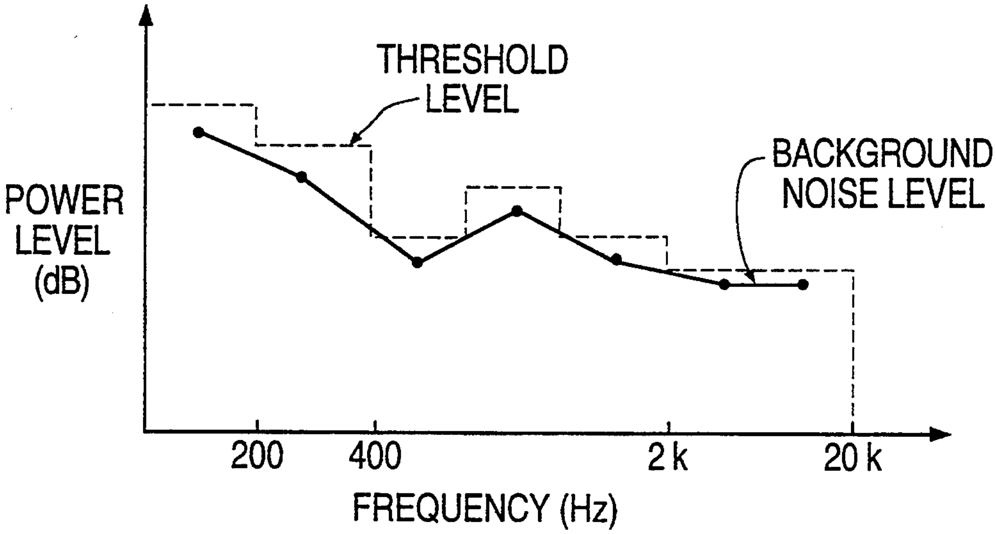
FIG. 8(*a*)–8(*b*) are explanatory diagrams for calculating the threshold time in the embodiment of FIG. 7, in which FIG. 8(*a*) shows an example of setting the threshold level, and FIG. (*b*) shows an example of the threshold time.
Figure 8B:
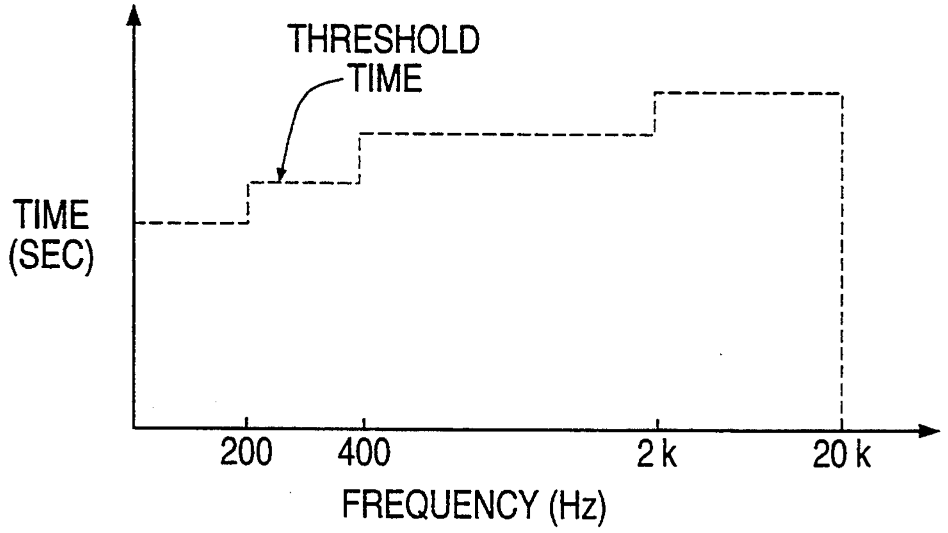

As the method of calculation of the threshold level and the threshold time, the background noise is first measured. From the result of the frequency analyzer 7, the threshold level is calculated in each of a plurality of frequency bands by the threshold calculator 11. FIG. 8 (*a*) shows an example of the threshold level, and FIG. 8 (*b*) shows an example of the threshold time. A howl tends to grow slowly in a low frequency band and grow rapidly in a high frequency band. Herein, in order that the howl detection time may be equal, the threshold time is set shorter in the lower frequency bands and longer in the higher frequency bands.

The determined threshold times and threshold levels are set as the howl judgement conditions in the howl detector 10 by the threshold controller part 12.

In the howl detector 10, when the input condition satisfies the a howl as conditions, it is judged that howl occurred, and its howling frequency is calculated. Consequently, the coefficient calculator 8 calculates such coefficients so as to compose a digital filter which lowers the gain of only the howling frequency component in the howl suppressor 6. The calculated coefficients of the digital filter are input to the howl suppressor 6 by the controller 9.

In this way, by analyzing the frequencies in the frequency analyzer 7, calculating the threshold characteristics depending on the background noise characteristics by the threshold calculator 11, detecting the howl by the howl detector 10, determining its frequency, and removing the howl frequency component by the digital filter, a howl can be eliminated even when the background noise is large.

The same effects are obtained also when plural microphones and speakers are used.

Instead of the method of setting the threshold level depending on the frequency characteristics of the background noise, the threshold level for howl detection in a band having a level of frequency characteristics may be increased depending on the frequency characteristics of the input signal, and the sensitivity for detecting a howl may be lowered, so that detection errors can be decreased.

As a further different embodiment of the invention, another sound amplifying apparatus is explained below while referring to the drawings.

Figure 9:
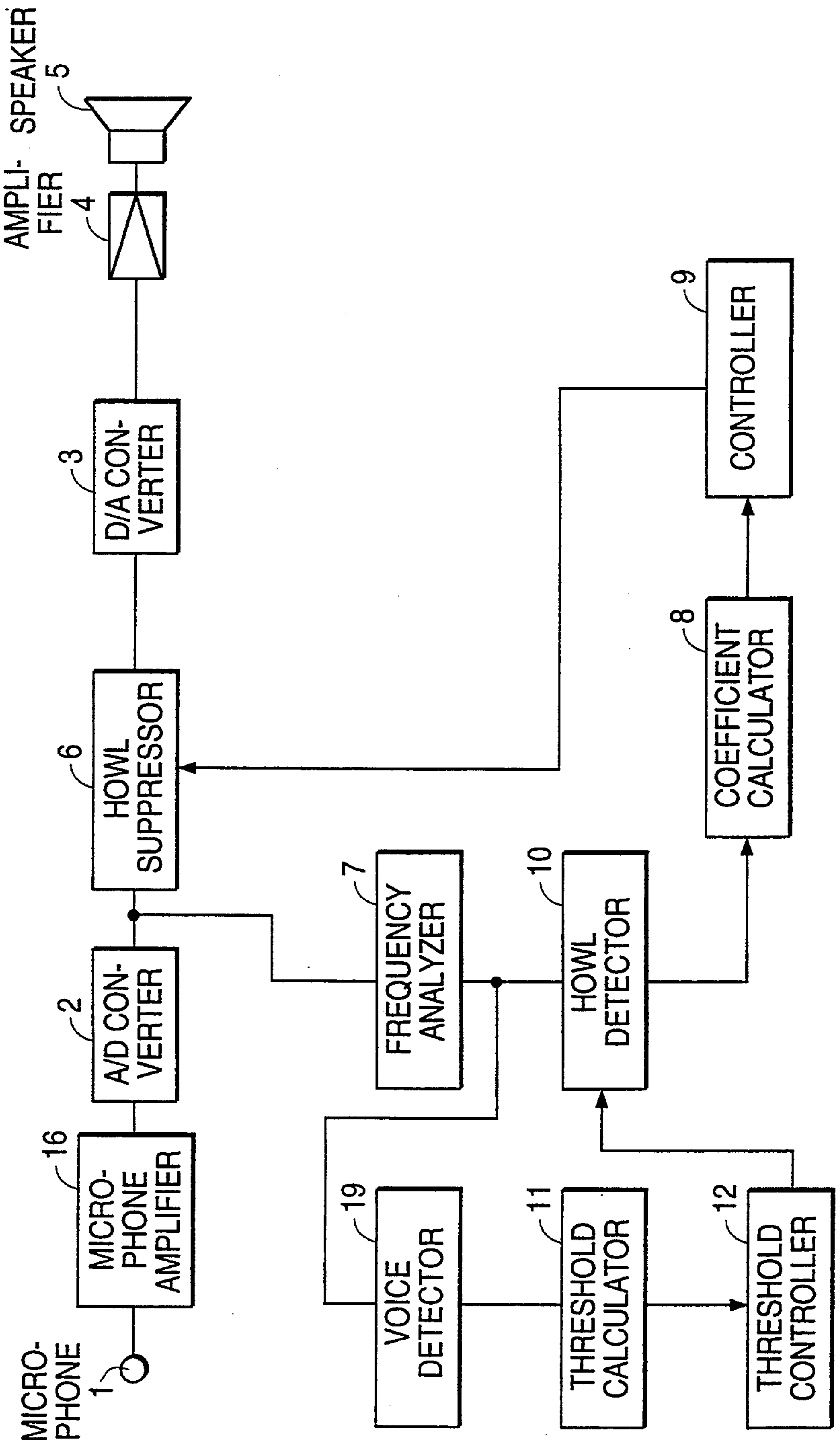
FIG. 9 is a block diagram of a sound amplifying apparatus in still accordance with another embodiment of the present invention.

FIG. 9 is a diagram showing a configuration of a sound amplifying apparatus of this embodiment. Element 19 is a voice detector for judging whether the input sound is a voice a non-voice from the signal from the A/D converter 2, and for detecting a voice period. The other constituent elements are the same as those in the foregoing embodiments of the invention.

Up to the frequency analyzer 7, the operation of the apparatus of FIG. 9 is the same as that of the embodiment shown in FIG. 1.

The voice detector 19 judges whether the signal picked up by the microphone 1 is a voice or a non-voice on the basis of the signal from the A/D converter 2. When judged to be voice, the threshold level for the detection of a howl of a the howl detector 10 is changed. In this embodiment, when the ratio of the peak power level to the mean power level exceeds a specific threshold level, it is judged that a howl has occurred. Therefore, the value of the threshold level is lowered during the voice period.

When the input sound is judged to be a voice by the voice judging part 19, the threshold calculator 11 calculates the threshold level depending on the voice components, and inputs the calculated threshold level to the howl detector 6 through the threshold level controller 12. The threshold level is set in each of plural frequency bands.

As the method of detecting howling, supposing it to be a howl when the power level ratio in any frequency band exceeds the threshold level, in the case of a voice, generally the voice pitch frequency components (from 200 to 300 Hz in the case of women, and from 130 to around 200 Hz in the case of men) may be mistaken as a howl. Therefore, the threshold level for detecting a howl in the frequency band near the voice pitch is Increased by the threshold controller 12, and the detection sensitivity is lowered, so that detection errors can be decreased.

Figure 10A:
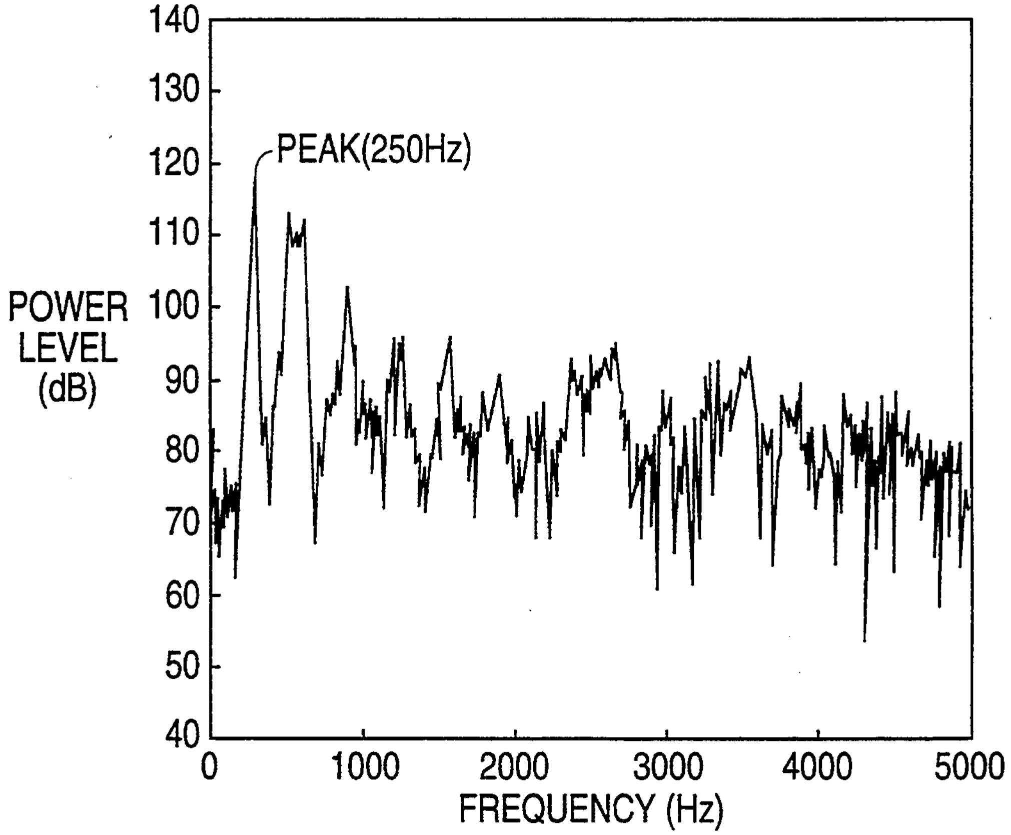
FIGS. 10(*a*)–10(*b*) are a diagrams showing a method of changing threshold level In the embodiment of FIG. 9, in which FIG. 10(*a*) shows a sound frequency characteristic, and FIG. 10(*b*) shows a method of changing a threshold.
Figure 10B:
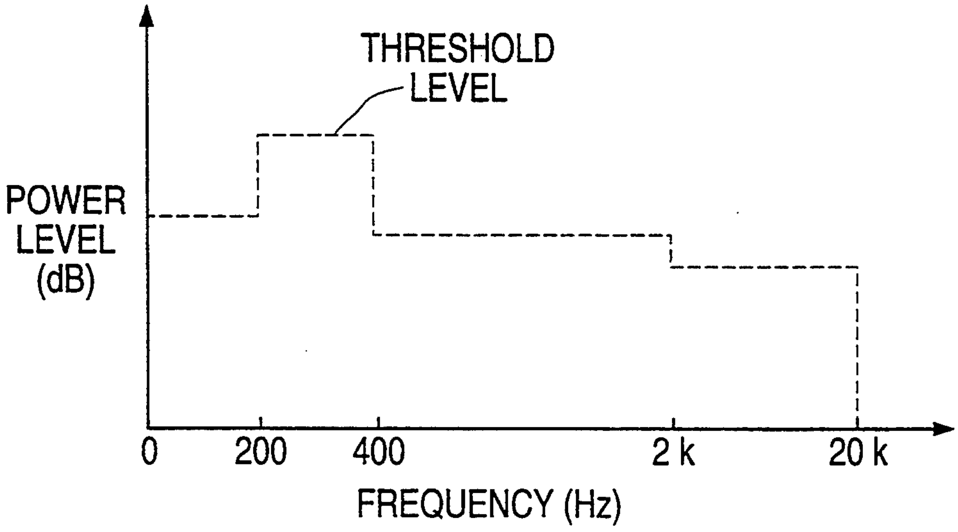

FIG. 10(*a*)–10(*b*) shows examples of frequency characteristics analyzed In the frequency analyzer 7 in the presence of voice, and the threshold level changing method. In the voice part, since the voice pitch frequency is around 250 Hz, the power level near the frequency of 250 Hz is large, so that by the threshold level of the ordinary howl detection, such a frequency is misjudged as a howl. Accordingly, as an example of voice, by setting the threshold level in the band of the pitch frequency to be larger than the peak level of the voice as shown in FIG. 10 (*b*), the detection of a howl can be prevented if the level in the band near 250 Hz becomes larger than the voice pitch.

Thus, in the voice portion judged by the voice detector 19, a howl can be detected more precisely by varying the threshold level for detecting a howl in the howl detector 10.

In this embodiment, howl may be detected by using the ratio of the peak power level to the mean power level of the signal picked up by the microphone 1, but various other methods are also possible, such as the method disclosed previously and the method of detecting a howl simply when the power level exceeds a certain threshold level.

Meanwhile, in the embodiment, the threshold level change of the detection in the case of voice is explained, but the wrong detection of a howl can be prevented in any acoustic conditions by varying the threshold level for howl detection, depending on the low frequency band having a high background noise level, the band having a high noise level at a specific frequency, or the acoustic condition of the room for howl detection.

Below is explained a sound amplifying apparatus in accordance with still another embodiment of the present invention by reference to the drawings.

Figure 11:
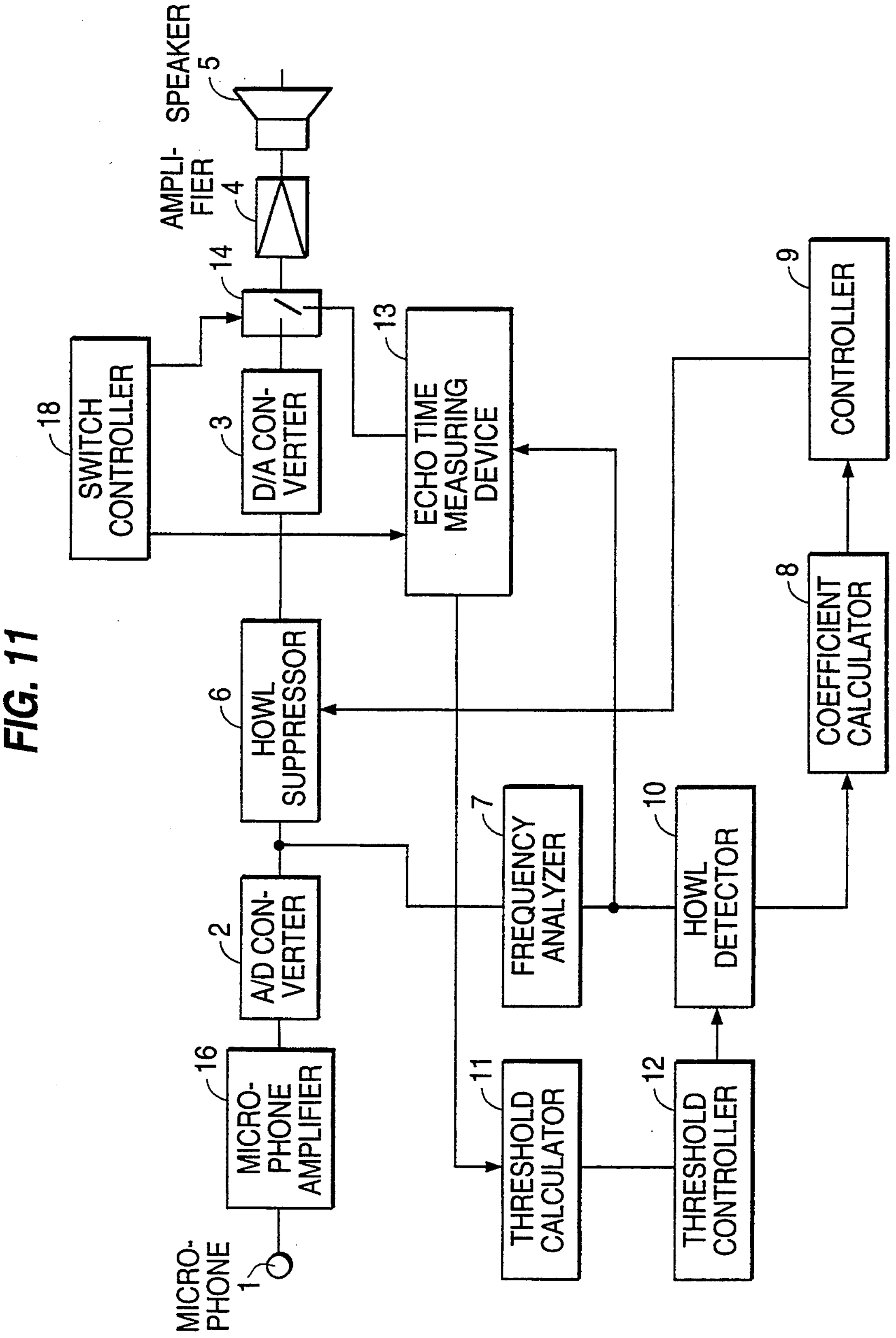
FIG. 11 is a block diagram of a sound amplifying apparatus in accordance with still another embodiment of the present invention.

FIG. 11 is a diagram showing a constitution of a sound amplifying apparatus of this embodiment. Element 13 is an echo time measuring device, and 14 is a changeover switch for switching the input signal to the amplifier 4 between the signal from the microphone 1 and a signal for measurement from the echo time measuring device 13. The other construction is the same as In the embodiment of the invention shown in FIG. 9.

First, the background noise and echo time are measured. Measurement of the background noise is the same as the operation in the embodiment shown in FIG. 7.

The echo time is measured by the echo time measuring device 13 possessing the function for measuring the generation of a measuring signal and an echo time. The changeover switch 14 is set to the echo time measuring device 13 side by the switch controller 16. In measurement, a measuring signal possessing a band component such as pink noise is generated from the echo time measuring device 13, amplified by the amplifier 4 reproduced through the speaker 5, and picked up by the microphone 1. When the measuring signal is reproduced through the speaker 5 and is sufficiently diffused, the measuring signal is stopped. In the echo time measuring device 13, on the basis of the attenuation waveform of the signal picked up by the microphone 1, the time of attenuation from the original level to −60 dB is determined in each of plural frequency bands. In the threshold calculator 11, on the basis of the background noise characteristics, the threshold level is determined in the same method as in the embodiment shown in FIG. 7, and the threshold time is calculated according to the measured echo time. To calculate the threshold time, at the frequency longer in echo time, the threshold time is set somewhat shorter because the change of power level is slow, and in a shorter echo time, the threshold time is set slightly longer because power changes are quick.

Figure 12:
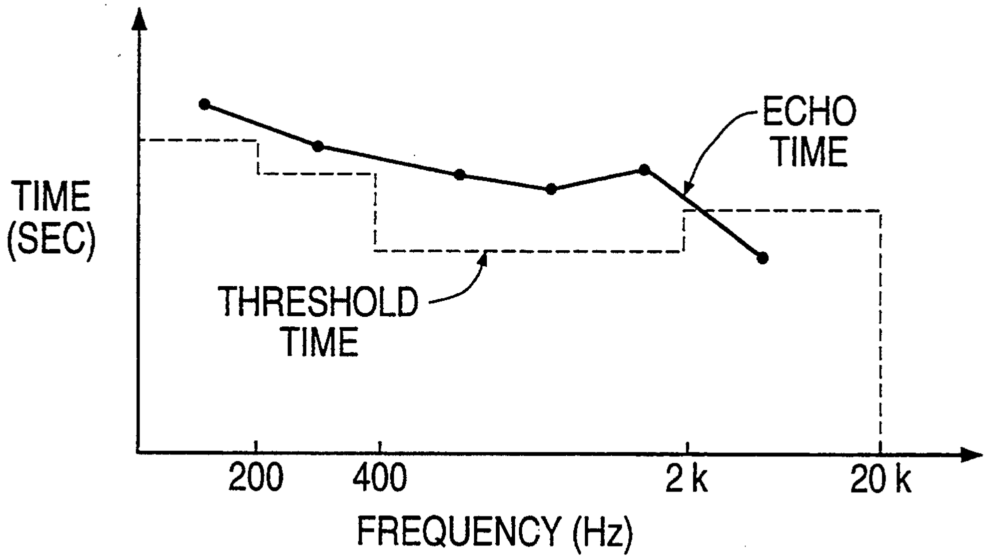
FIG. 12 is an explanatory diagram of a threshold time calculation in the embodiment of FIG. 11.

FIG. 12 is an explanatory diagram of an example of setting the threshold time depending on the echo time.

In this way, the threshold level and threshold time are determined.

When the echo time is measured, and the threshold level and threshold time are determined, the changeover switch 14 is changed to the D/A converter 3 side by the switch controller 18. Hereinafter, the howl detection and suppression actions are the same as those in the embodiment shown in FIG. 7.

By detecting howling by using the threshold level and threshold time calculated on the basis of the echo time measured by the echo time measuring device 13, a howl can be detected and suppressed more precisely even in a location where the echo time is long.

In the embodiment, to detect howl, sound is picked up by the microphone 1, and the ratio of the maximum peak power level to the mean power level of the signal analyzed into frequency components by the frequency analyzer 7 is used, but simply It may be judged to be howl, for example, when the power level of the signal picked up by the microphone 1 exceeds a certain threshold level, or other various methods may be possible.

As the method for measuring the echo time, it may be also possible to measure by using an impulse or chirp signal.

Incidentally, if the echo time of the location is known beforehand, instead of the echo time measuring device 13 and changeover switch 14, a memory for storing the echo time may be installed in the constituent block.

Figure 13:
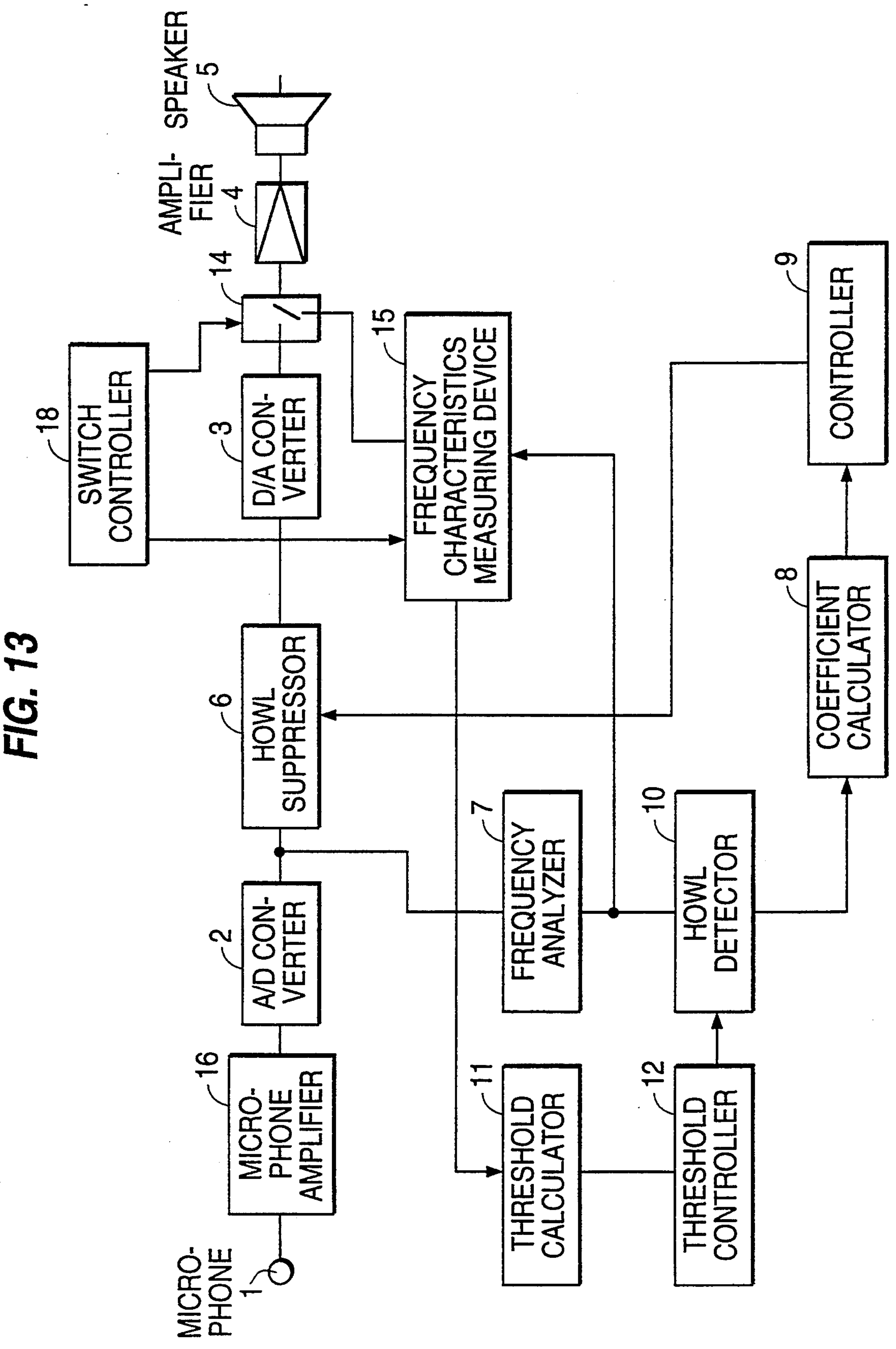
FIG. 13 is a block diagram of a sound amplifying apparatus in accordance with still another embodiment of the present invention.

FIG. 13 shows a constitution of a sound amplifying apparatus in accordance with still another embodiment of the present invention. Element 15 is a frequency characteristics measuring device, and element 18 is a changeover switch for switching the input signal into the amplifier 4 between the signal picked up by the microphone 1 and a signal for measuring frequency characteristics coming from the frequency characteristics measuring device 15. The other elements are the same as those of the preceding embodiment.

First, the frequency characteristics of the room from the speaker 5 to the microphone 1 are measured. The frequency characteristics are measured by the frequency characteristics measuring device 15. By the switch controller 18, the changeover switch 17 is set to the frequency characteristics measuring device 15 side. In measurement, a measuring signal possessing a wide band component such as pink noise is generated from the frequency measuring device 15, amplified by the amplifier 4, and reproduced through the speaker 5. The sound is picked up by the microphone 1, and frequency analyzed by the frequency analyzer 7.

In the threshold calculating part 11, on the basis of the frequency characteristics analyzed by the frequency analyzer 7, the threshold level is determined. For example, where the distance between the microphone 1 and speaker 5 is long, the power level in a high band is small, so that the threshold level is set low.

Figure 14:
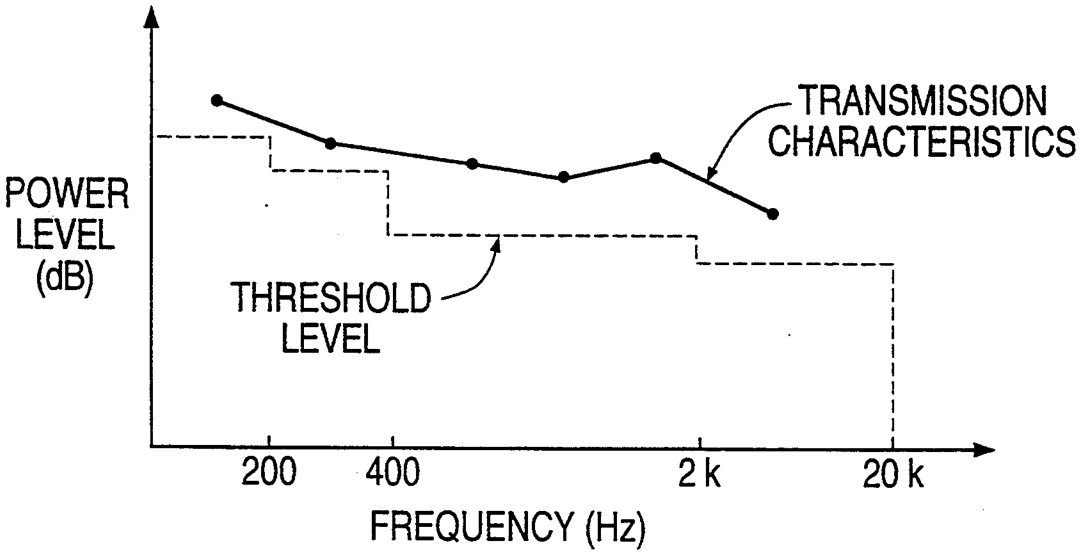
FIG. 14 is an explanatory diagram of threshold level calculation in the embodiment of FIG. 13.

FIG. 14 shows an example of setting of the threshold level depending on the frequency characteristics.

In this way, the threshold level is calculated.

Consequently, by the switch controller 18, the changeover switch 17 is set to the D/A converter 3 side. Thereafter, the howling detecting and suppressing actions are the same as those in the embodiment shown in FIG. 7.

Thus, using the threshold level calculated on the basis of the frequency characteristics measured by the frequency characteristics measuring device 15, a howl is detected, so that a howl can be detected more precisely depending on the room conditions, or the frequency characteristics of the room in which the microphone and speaker are placed.

In the explanation of the foregoing embodiments, the notch filter is used in the howl suppressor 6, but the same effects are obtained by using an FIR (finite impulse response) filter.

What is claimed is:

1. A sound amplifying apparatus comprising:

a microphone for picking up a sound to obtain a sound signal;

an analog-to-digital converter for converting the sound signal from the microphone to a digital sound signal;

a howl suppressor including a digital filter, said howl suppressor processing the digital sound signal;

a digital-to-analog converter for converting a processed digital sound signal from the howl suppressor into a processed analog signal;

an amplifier, said amplifier amplifying the processed analog sound signal to obtain an amplified sound signal;

a speaker responsive to the amplified sound signal for generating an amplified sound;

a frequency analyzer, said frequency analyzer frequency analyzing the digital sound signal from the analog-to-digital converter in real time;

a howl detector, said howl detector detecting a howl contained in the sound signal from a result of frequency analysis by the frequency analyzer, wherein the howl detector means detects a maximum peak power level among power levels of the sound signal in a frequency region analyzed by the frequency analyzer, calculates an adjusted mean power level of the sound signal by omitting first to m-th largest peak power levels from all power levels in the frequency region, where m is a predetermined integer larger than 0, and calculates a mean value of the remaining power levels, calculates a ratio of the maximum peak power level to the adjusted mean power level, and judges that the maximum power level is a howl component when the ratio is larger than a predetermined threshold level;

a coefficient calculator, said coefficient calculator calculating coefficients to be input to the digital filter to suppress the howl according to a detection result by the howl detector; and a controller, said controller inputting the calculated coefficients to the digital filter.

2. An apparatus according to claim 1, wherein the howl detector judges that the maximum peak power level among the power levels of the sound signal in the frequency region analyzed by the frequency analyzer is a howl component when a frequency of the maximum peak power level is maintained constant for a predetermined period of time.

3. A sound amplifying apparatus comprising:

a microphone for picking up a sound to obtain a sound signal;

an analog-to-digital converter for converting the sound signal from the microphone to a digital sound signal;

a howl suppressor including a digital filter, said howl suppressor processing the digital sound signal;

a digital-to-analog converter for converting a processed digital sound signal from the howl suppressor into a processed analog signal;

an amplifier, said amplifier amplifying the processed analog sound signal to obtain an amplified sound signal;

a speaker responsive to the amplified sound signal for generating an amplified sound;

a frequency analyzer, said frequency analyzer frequency analyzing the digital sound signal from the analog-to-digital converter in real time;

a howl detector, said howl detector detecting a howl contained in the sound signal from a result of frequency analysis by the frequency analyzer, wherein the howl detector detects a maximum peak power level among power levels of the sound signal in a frequency region analyzed by the frequency analyzer, adjusts a mean value of all power levels in the frequency region to obtain an adjusted mean power level, calculates a ratio of the maximum peak power level to the adjusted mean power level, and judges that the maximum power level is a howl component when the ratio is larger than a threshold level for a threshold time;

a threshold controller, said threshold controller controlling the threshold level;

a coefficient calculator, said coefficient calculator calculating coefficients to be input to the digital filter to suppress the howl according to a detection result by the howl detector;

a controller, said controller inputting the calculated coefficients to the digital filter, and a frequency characteristic measuring device for measuring a frequency characteristic of a room in which the microphone and speaker are located from a position of the speaker to a position of the microphone, wherein the threshold controller is responsive to a measuring result by the frequency characteristic measuring device for changing the threshold level depending on the frequency characteristic of the room.

4. A sound amplifying apparatus comprising:

a microphone for picking up a sound to obtain a sound signal;

an analog-to-digital converter for converting the sound signal from the microphone to a digital sound signal;

a howl suppressor including a digital filter, said howl suppressor processing the digital sound signal;

a digital-to-analog converter for converting a processed digital sound signal from the howl suppressor into a processed analog signal;

an amplifier, said amplifier amplifying the processed analog sound signal to obtain an amplified sound signal;

a speaker responsive to the amplified sound signal for generating an amplified sound;

a frequency analyzer, said frequency analyzer frequency analyzing the digital sound signal from the analog-to-digital converter in real time;

a howl detector, said howl detector detecting a howl contained in the sound signal from a result of frequency analysis by the frequency analyzer, wherein the howl detector detects a maximum peak power level among power levels of the sound signal in a frequency region analyzed by the frequency analyzer, adjusts a mean value of all power levels in the frequency region to obtain an adjusted mean power level, calculates a ratio of the maximum peak power level to the adjusted mean power level, and judges that the maximum power level is a howl component when the ratio is larger than a threshold level for a threshold time;

a threshold controller, said threshold controller controlling the threshold level;

a coefficient calculator, said coefficient calculator calculating coefficients to be input to the digital filter to suppress the howl according to a detection result by the howl detector;

a controller, said controller inputting the calculated coefficients to the digital filter, and an echo measuring device for measuring an echo time in a room in which the microphone and speaker are located, wherein the threshold controller is responsive to a measuring result by the echo measuring device for changing the threshold time depending on the echo time.

5. An apparatus according to claim 4, wherein the threshold controller decreases the threshold time when the echo time increases.

6. A sound amplifying apparatus comprising:

a microphone for picking up a sound to obtain a sound signal;

an analog-to-digital converter for converting the sound signal from the microphone to a digital sound signal;

a howl suppressor including a digital filter, said howl suppressor processing the digital sound signal;

a digital-to-analog converter for converting a processed digital sound signal from the howl suppressor to a processed analog signal;

an amplifier, said amplifier amplifying the processed analog sound signal to obtain an amplified sound signal;

a speaker responsive to the amplified sound signal for generating an amplified sound;

a frequency analyzer, said frequency analyzer frequency analyzing the digital sound signal from the analog-to-digital converter in real time;

a howl detector, said howl detector detecting a howl contained in the sound signal from a result of frequency analysis by the frequency analyzer, wherein the howl detector detects a maximum peak power level among power levels of the sound signal in a frequency region analyzed by the frequency analyzer, calculates an adjusted mean power level of the sound signal by omitting first to m-th largest peak power levels from all power levels in the frequency region, where m is a predetermined integer larger than 0, and calculates a mean value of the remaining power levels, calculates a ratio of the maximum peak power level to the adjusted mean power level, and judges that the maximum power level is a howl component when the ratio is larger than a threshold level;

a threshold controller, said threshold controller controlling the threshold level;

a coefficient calculator, said coefficient calculator calculating coefficients to be input to the digital filter to suppress the howl according to a detection result by the howl detector; and a controller, said controller inputting the calculated coefficients to the digital filter.

7. An apparatus according to claim 6, further comprising a voice detector responsive to the result of frequency analysis by the frequency analyzer for judging whether or not the picked-up sound is a voice , wherein the threshold controller is responsive to a judging result by the voice detector for changing the threshold level in a frequency band containing voice pitch frequency components when the picked-up sound is a voice.

8. An apparatus according to claim 7, wherein the threshold controller increases the threshold level in the frequency band containing voice pitch frequency components when the picked-up sound is a voice.

9. A sound amplifying apparatus comprising:

a microphone for picking up a sound to obtain a sound signal;

an analog-to-digital converter for converting the sound signal from the microphone to a digital sound signal;

a howl suppressor including a digital filter, said howl suppressor processing the digital sound signal;

a digital-to-analog converter for converting a processed digital sound signal from the howl suppressor into a processed analog signal;

an amplifier, said amplifier amplifying the processed analog sound signal to obtain an amplified sound signal;

a speaker responsive to the amplified sound signal for generating an amplified sound;

a frequency analyzer, said frequency analyzer frequency analyzing the digital sound signal from the analog-to-digital converter in real time;

a howl detector, said howl detector detecting a howl contained in the sound signal from a result of frequency analysis by the frequently analyzing means, wherein the howl detector detects a maximum peak power level among power levels of the sound signal in a frequency region analyzed by the frequency analyzer, adjusts a mean value of all power levels in the frequency region to obtain an adjusted mean power level, calculates a ratio of the maximum peak power level to the adjusted mean power level, and judges that the maximum power level is a howl component when the ratio is larger than a threshold level;

a threshold controller, said threshold controller controlling the threshold level;

a coefficient calculator, said coefficient calculator calculating coefficients to be input to the digital filter to suppress the howl according to a detection result by the howl detector; and a controller, said controller inputting the calculated coefficients to the digital filter;

wherein the threshold controller is responsive to the result of frequency analysis by the frequency analyzer for changing the threshold level depending on a frequency characteristic of the sound signal.

10. A sound amplifying apparatus comprising:

a microphone for picking up a sound to obtain a sound signal;

an analog-to-digital converter for converting the sound signal from the microphone to a digital sound signal;

a howl suppressor including a digital filter, said howl suppressor processing the digital sound signal;

a digital-to-analog converter for converting a processed digital sound signal from the howl suppressor into a processed analog signal;

an amplifier, said amplifier amplifying the processed analog sound signal to obtain an amplified sound signal;

a speaker responsive to the amplified sound signal for generating an amplified sound;

a frequency analyzer, said frequency analyzer frequency analyzing the digital sound signal from the analog-to-digital converter in real time;

a howl detector, said howl detector detecting a howl contained in the sound signal from a result of frequency analysis by the frequency analyzer, wherein the howl detector detects a maximum peak power level among power levels of the sound signal in a frequency region analyzed by the frequency analyzing means, adjusts a mean value of all power levels in the frequency region to obtain an adjusted mean power level, calculates a ratio of the maximum peak power level to the adjusted mean power level, and judges that the maximum power level is a howl component when the ratio is larger than a threshold level a threshold controller, said threshold controller controlling the threshold level;

a coefficient calculator, said coefficient calculator calculating coefficients to be input to the digital filter to suppress the howl according to a detection result by the howl detector; and a controller, said controller inputting the calculated coefficients to the digital filter;

wherein the threshold controller is responsive to the result of frequency analysis by the frequency analyzer for controlling the threshold level to be a level dependent on a frequency band in which the frequency of the maximum peak power level is located.

11. An apparatus according to claim 10, wherein the threshold controller has stored therein a plurality of threshold levels for a plurality of frequency bands in the frequency region analyzed by the frequency analyzer depending on a frequency characteristic of a background noise contained in the frequency region, and selects one of the plurality of threshold levels depending on the frequency band in which the frequency of the maximum peak power level is located in response to the result of frequency analysis by the frequency analyzing means.

12. A sound amplifying apparatus comprising:

a microphone for picking up a sound to obtain a sound signal;

an analog-to-digital converter for converting the sound signal from the microphone to a digital sound signal;

a howl suppressor including a digital filter, said howl suppressor processing the digital sound signal;

a digital-to-analog converter for converting a processed digital sound signal from the howl suppressor into a processed analog signal;

an amplifier, said amplifier amplifying the processed analog sound signal to obtain an amplified sound signal;

a speaker responsive to the amplified sound signal for generating an amplified sound;

a frequency analyzer, said frequency analyzer frequency analyzing the digital sound signal from the analog-to-digital converter in real time;

a howl detector, said howl detector detecting a howl contained in the sound signal from a result of frequency analysis by the frequency analyzer, wherein the howl detector detects a maximum peak power level among power levels of the sound signal in a frequency region analyzed by the frequency analyzer, adjusts a mean value of all power levels in the frequency region to obtain an adjusted mean power level, calculates a ratio of the maximum peak power level to the adjusted mean power level, and judges that the maximum power level is a howl component when the ratio is larger than a threshold level for a threshold time;

a threshold controller, said threshold controller controlling the threshold level;

a coefficient calculator, said coefficient calculator calculating coefficients to be input to the digital filter to suppress the howl according to a detection result by the howl detector;

a controller, said controller inputting the calculated coefficients to the digital filter, and a frequency characteristic measuring device for measuring a frequency characteristic of a room in which the microphone and speaker are located from a position of the speaker to a position of the microphone, wherein the threshold controller is responsive to a measuring result by the frequency characteristic measuring device for changing the threshold level depending on the frequency characteristic of the room.

13. A sound amplifying apparatus comprising:

a microphone for picking up a sound to obtain a sound signal;

an analog-to-digital converter for converting the sound signal from the microphone to a digital sound signal;

a howl suppressor including a digital filter, said howl suppressor processing the digital sound signal;

a digital-to-analog converter for converting a processed digital sound signal from the howl suppressor to a processed analog signal;

an amplifier, said amplifier amplifying the processed analog sound signal to obtain an amplified sound signal;

a speaker responsive to the amplified sound signal for generating an amplified sound;

a frequency analyzer, said frequency analyzer frequency analyzing the digital sound signal from the analog-to-digital converter in real time;

a howl detector, said howl detector detecting a howl contained in the sound signal from a result of frequency analysis by the frequency analyzer, wherein the howl detector detects a maximum peak power level among power levels of the sound signal in a frequency region analyzed by the frequency analyzer, calculates an adjusted mean power level of the sound signal by omitting first to m-th largest peak power levels from all power levels in the frequency region, where m is a predetermined integer larger than 0, and calculates a mean value of the remaining power levels, calculates a ratio of the maximum peak power level to the adjusted mean power level, and judges that the maximum power level is a howl component when the ratio is larger than a threshold level for a threshold time;

a threshold controller, said threshold controller controlling the threshold level and the threshold time;

a coefficient calculator, said coefficient calculator calculating coefficients to be input to the digital filter to suppress the howl according to a detection result by the howl detector; and a controller, said controller inputting the calculated coefficients to the digital filter.

14. An apparatus according to claim 13, further comprising a voice detector responsive to the result of frequency analysis by the frequency analyzer for judging whether or not the picked-up sound is a voice, wherein the threshold controller is responsive to a judging result by the voice detector for changing the threshold level in a frequency band containing voice pitch frequency components when the picked-up sound is a voice.

15. An apparatus according to claim 14, wherein the threshold controller increases the threshold level in the frequency band containing voice pitch frequency components when the picked-up sound is a voice.

16. A sound amplifying apparatus comprising:

a microphone for picking up a sound to obtain a sound signal;

an analog-to-digital converter for converting the sound signal from the microphone to a digital sound signal;

a howl suppressor including a digital filter, said howl suppressor processing the digital sound signal;

a digital-to-analog converter for converting a processed digital sound signal from the howl suppressor into a processed analog signal;

an amplifier, said amplifier amplifying the processed analog sound signal to obtain an amplified sound signal;

a speaker responsive to the amplified sound signal for generating an amplified sound;

a frequency analyzer, said frequency analyzer frequency analyzing the digital sound signal from the analog-to-digital converter in real time;

a howl detector, said howl detector detecting a howl contained in the sound signal from a result of frequency analysis by the frequency analyzer, wherein the howl detector detects a maximum peak power level among power levels of the sound signal in a frequency region analyzed by the frequency analyzer, adjusts a mean value of all power levels in the frequency region to obtain an adjusted mean power level, calculates a ratio of the maximum peak power level to the adjusted mean power level, and judges that the maximum power level is a howl component when the ratio is larger than a threshold level for a threshold time;

a threshold controller, said threshold controller controlling the threshold level;

a coefficient calculator, said coefficient calculator calculating coefficients to be input to the digital filter to suppress the howl according to a detection result by the howl detector;

a controller, said controller inputting the calculated coefficients to the digital filter;

wherein the threshold controller is responsive to the result of frequency analysis by the frequency analyzer for controlling at least one of the threshold level and the threshold time to be a value dependent on a frequency band in which the frequency of the maximum peak power level is located.

17. An apparatus according to claim 16, wherein the threshold controller increases the threshold time when the frequency band in which the frequency of the maximum peak power level is located becomes higher.

18. An apparatus according to claim 16, wherein the threshold controller has stored therein a plurality of threshold levels for a plurality of frequency bands in the frequency region analyzed by the frequency analyzer depending on a frequency characteristic of a background noise contained in the frequency region, and selects one of the plurality of threshold levels depending on the frequency band in which the frequency of the maximum peak power level is located in response to the result of frequency analysis by the frequency analyzer.

19. A sound amplifying apparatus comprising:

a microphone for picking up a sound to obtain a sound signal;

an analog-to-digital converter for converting the sound signal from the microphone to a digital sound signal;

a howl suppressor including a digital filter, said howl suppressor processing the digital sound signal;

a digital-to-analog converter for converting a processed digital sound signal from the howl suppressor into a processed analog signal;

an amplifier, said amplifier amplifying the processed analog sound signal to obtain an amplified sound signal;

a speaker responsive to the amplified sound signal for generating an amplified sound;

a frequency analyzer, said frequency analyzer frequency analyzing the digital sound signal from the analog-to-digital converter in real time;

a howl detector, said howl detector detecting a howl contained in the sound signal from a result of frequency analysis by the frequency analyzer, wherein the howl detector detects a maximum peak power level among power levels of the sound signal in a frequency region analyzed by the frequency analyzer, adjusts a mean value of all power levels in the frequency region to obtain an adjusted mean power level, calculates a ratio of the maximum peak power level to the adjusted mean power level, and judges that the maximum power level is a howl component when the ratio is larger than a threshold level for a threshold time;

a threshold controller, said threshold controller controlling the threshold level;

a coefficient calculator, said coefficient calculator calculating coefficients to be input to the digital filter to suppress the howl according to a detection result by the howl detector; and a controller, said controller inputting the calculated coefficients to the digital filter;

wherein the threshold controller is responsive to the result of frequency analysis by the frequency analyzer for changing the threshold level depending on a frequency characteristic of the sound signal.

* * * * *